(12) United States Patent
Hokuto et al.

(10) Patent No.: US 12,693,699 B2
(45) Date of Patent: Jul. 28, 2026

(54) BRAKE DEVICE

(71) Applicant: DENSO CORPORATION, Kariya-city (JP)

(72) Inventors: Daisuke Hokuto, Kariya-city (JP); Etsugo Yanagida, Kariya-city (JP); Takuto Kita, Kariya-city (JP); Yuusuke Yoshida, Kariya-city (JP); Soichi Kinouchi, Kariya-city (JP); Tetsuo Hariu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 560 days.

(21) Appl. No.: 18/173,727

(22) Filed: Feb. 23, 2023

(65) Prior Publication Data

US 2023/0195157 A1 Jun. 22, 2023

Related U.S. Application Data

(63) Continuation of application No. PCT/JP2021/029369, filed on Aug. 6, 2021.

(30) Foreign Application Priority Data

Aug. 26, 2020 (JP) ................................. 2020-142634

(51) Int. Cl.
*B60T 7/04* (2006.01)
*B60T 7/06* (2006.01)
(Continued)

(52) U.S. Cl.
CPC ................ *G05G 5/03* (2013.01); *B60T 7/042* (2013.01); *B60T 7/06* (2013.01); *B60T 8/17* (2013.01);
(Continued)

(58) Field of Classification Search
CPC . B60T 7/06; B60T 7/065; B60T 8/409; B60T 2220/04; B60T 2270/82; G05G 5/03
See application file for complete search history.

(56) References Cited

U.S. PATENT DOCUMENTS 10,173,650 B1 * 1/2019 Harrison ................... B60T 7/06
11,249,506 B1 * 2/2022 Kim .......................... B60T 7/06
(Continued)

FOREIGN PATENT DOCUMENTS

FR 2 913 119 A1 8/2008
JP 2001-278021 A 10/2001
(Continued)

*Primary Examiner* — Bradley T King
(74) *Attorney, Agent, or Firm* — Nixon & Vanderhye P.C.

(57) ABSTRACT

A brake device for a brake-by-wire system includes a brake pedal, a sensor, a reaction force generator, and a reaction force changing mechanism. The brake pedal is rotatably mounted on a housing and not mechanically connected to a hydraulic pressure generator. The sensor outputs a signal corresponding to a stroke amount of the brake pedal to an electronic control unit. The reaction force generator has one end connected to the brake pedal and the other end connected to the housing so as to generate a reaction force against a depression force applied to the brake pedal by a driver. The reaction force changing mechanism generates a reaction force against a depression force applied to the brake pedal by the driver, and is able to change a magnitude of the reaction force in advance according to the driver.

3 Claims, 13 Drawing Sheets

(51) Int. Cl.
 *G05G 5/03* (2008.04)
 *B60T 8/17* (2006.01)
(52) U.S. Cl.
 CPC ....... *B60T 2220/04* (2013.01); *B60T 2270/82*
 (2013.01)

(56) References Cited

U.S. PATENT DOCUMENTS

| | | | | |
|---|---|---|---|---|
| 11,780,417 | B2 * | 10/2023 | Park | B60T 8/4086 |
| | | | | 303/113.4 |
| 2003/0188600 | A1 * | 10/2003 | Slanec | B60T 7/042 |
| | | | | 74/514 |
| 2006/0231074 | A1 * | 10/2006 | Ueno | B60T 7/042 |
| | | | | 123/399 |
| 2007/0245844 | A1 | 10/2007 | Yokoyama et al. | |
| 2010/0200342 | A1 * | 8/2010 | Drott | B60T 8/4077 |
| | | | | 188/152 |
| 2011/0202250 | A1 | 8/2011 | Miyajima et al. | |
| 2012/0221220 | A1 | 8/2012 | Yamazaki et al. | |
| 2014/0136069 | A1 | 5/2014 | Jung et al. | |
| 2014/0361473 | A1 * | 12/2014 | Ryu | B60T 7/06 |
| | | | | 267/140.2 |
| 2015/0274142 | A1 * | 10/2015 | Ishizuki | G05G 1/30 |
| | | | | 188/152 |

| | | | | |
|---|---|---|---|---|
| 2016/0107625 | A1 * | 4/2016 | Shand | B60W 10/188 |
| | | | | 701/22 |
| 2017/0050625 | A1 | 2/2017 | Kawazu et al. | |
| 2018/0001875 | A1 * | 1/2018 | Houtman | B60T 7/042 |
| 2018/0093648 | A1 * | 4/2018 | Pennala | B60T 7/06 |
| 2019/0329748 | A1 * | 10/2019 | Kawakami | B60T 8/368 |
| 2020/0130663 | A1 | 4/2020 | Ye et al. | |
| 2021/0039612 | A1 * | 2/2021 | Marquez Sanchez | B60T 8/326 |
| 2021/0291665 | A1 * | 9/2021 | Liu | B60T 8/171 |
| 2022/0144224 | A1 * | 5/2022 | Tarandek | G05G 5/03 |
| 2022/0314939 | A1 * | 10/2022 | Wagner | B60T 8/409 |
| 2023/0036663 | A1 * | 2/2023 | Beuerle | B60T 8/409 |
| 2024/0227747 | A1 * | 7/2024 | Kim | B60T 8/409 |
| 2024/0227748 | A1 * | 7/2024 | Austermeier | B60T 7/06 |

FOREIGN PATENT DOCUMENTS

| | | | |
|---|---|---|---|
| JP | 2006-264569 A | 10/2006 | |
| JP | 2006-281871 | 10/2006 | |
| JP | 2006-281872 A | 10/2006 | |
| JP | 2009-271694 A | 11/2009 | |
| JP | 2010-095008 | 4/2010 | |
| KR | 10-2014-0060897 | 5/2014 | |
| KR | 10-2017-0054849 | 5/2017 | |
| KR | 10-2020-0066408 | 6/2020 | |
| WO | WO-2021172915 A1 * | 9/2021 | B60T 8/172 |

* cited by examiner

BRAKE DEVICE

CROSS REFERENCE TO RELATED APPLICATION

The present application is a continuation application of International Patent Application No. PCT/JP2021/029369 filed on Aug. 6, 2021, which designated the U.S. and claims the benefit of priority from Japanese Patent Application No. 2020-142634 filed on Aug. 26, 2020. The entire disclosures of all of the above applications are incorporated herein by reference.

TECHNICAL FIELD

The present disclosure relates to a brake device.

BACKGROUND

Conventionally, a brake-by-wire system is known in which an electronic control unit controls a drive of a hydraulic pressure generator that generates hydraulic pressure in a brake circuit of a vehicle.

SUMMARY

According to one aspect of the present disclosure, a brake device is for a brake-by-wire system in which a hydraulic pressure generator is driven by an electronic control unit to generate hydraulic pressure in a brake circuit a vehicle. The brake device includes a housing, a brake pedal, a sensor, a reaction force generator, and a reaction force changing mechanism. The housing is attached to a body of the vehicle. The brake pedal is rotatably mounted on the housing. The brake pedal is not mechanically connected to the hydraulic pressure generator. The sensor outputs a signal corresponding to a stroke amount of the brake pedal to the electronic control unit. The reaction force generator has one end connected to the brake pedal and the other end connected to the housing so as to generate a reaction force against a depression force applied to the brake pedal by a driver. The reaction force changing mechanism generates a reaction force against a depression force applied to the brake pedal by the driver, and is able to change a magnitude of the reaction force in advance according to the driver.

DETAILED DESCRIPTION

Figure 1:
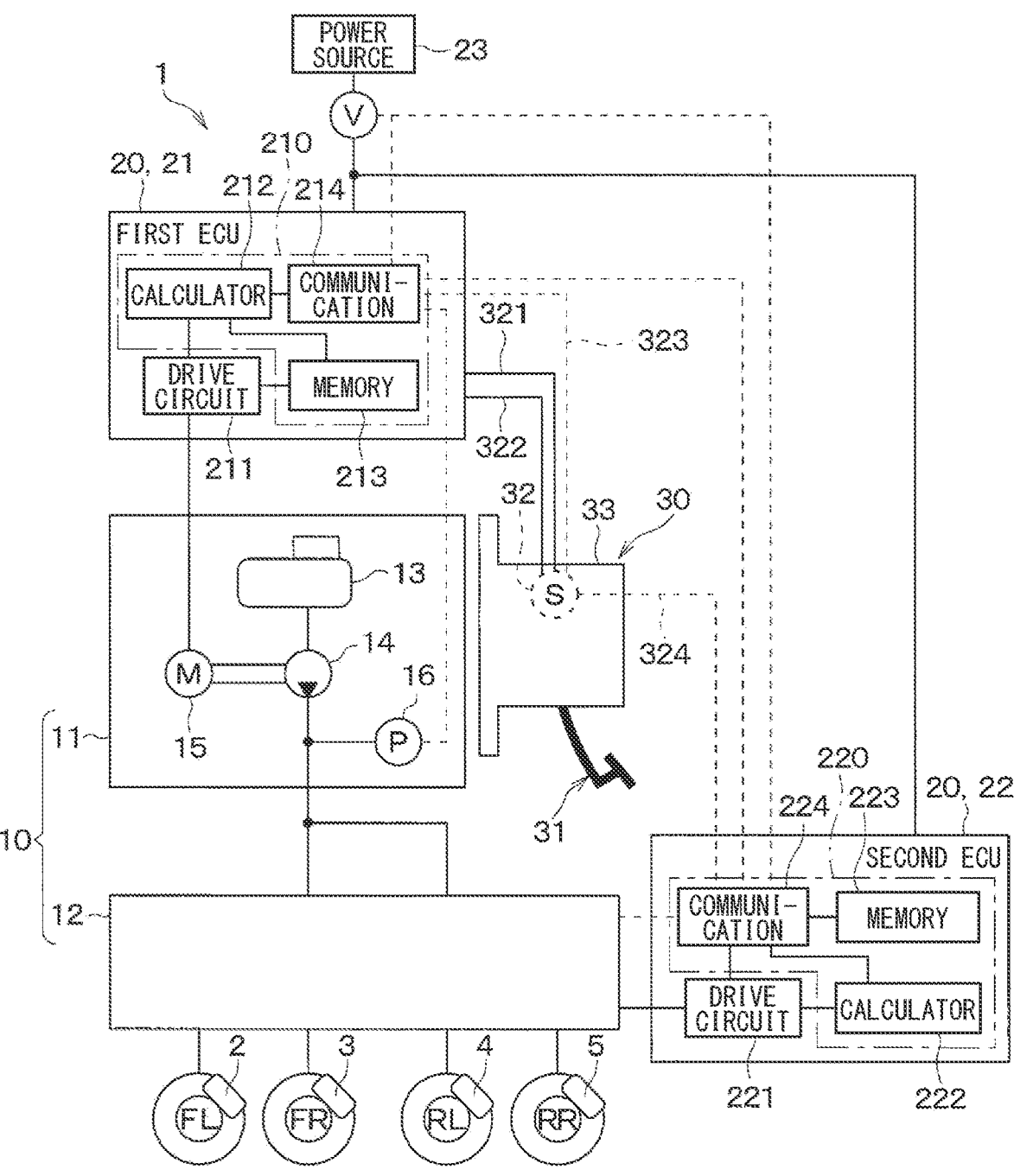
FIG. 1 is a configuration diagram of a brake-by-wire system using a brake device according to a first embodiment.

Conventionally, a brake-by-wire system is known in which an electronic control unit controls a drive of a hydraulic pressure generator that generates hydraulic pressure in a brake circuit of a vehicle.

A brake device for a brake-by-wire system includes a reaction force generating mechanism that generates a reaction force against the driver's depression force applied to the brake pedal (hereinafter referred to as the reaction force of the brake pedal). The brake-by-wire system controls to increase or decrease a ratio of the braking force to the pedal stroke according to a target deceleration and a current deceleration of the vehicle. When performing the control, the reaction force generating mechanism increases the reaction force of the brake pedal so that the driver can feel it.

However, the reaction force of the brake pedal is changed even while the vehicle is decelerating. The reaction force of the brake pedal changes while the driver is stepping on the brake pedal to generate the braking force of the vehicle. In this case, the operation by the driver may be affected by a deterioration in the operability of the brake pedal by the driver. In addition, if the reaction force of the brake pedal is suddenly increased while the vehicle is decelerating, the driver will feel that the pedal is being pushed back, and the driver may loosen the depression of the brake pedal. In that case, the vehicle braking distance may increase.

The present disclosure provides a brake device that can reduce driver's fatigue and improve controllability by changing the reaction force characteristics of the brake pedal according to the driver's preference.

According to one aspect of the present disclosure, a brake device is for a brake-by-wire system in which a hydraulic pressure generator is driven by an electronic control unit to generate hydraulic pressure in a brake circuit a vehicle. The brake device includes a housing, a brake pedal, a sensor, a reaction force generator, and a reaction force changing mechanism. The housing is attached to a body of the vehicle. The brake pedal is rotatably mounted on the housing. The brake pedal is not mechanically connected to the hydraulic pressure generator. The sensor outputs a signal corresponding to a stroke amount of the brake pedal to the electronic control unit. The reaction force generator has one end connected to the brake pedal and the other end connected to the housing so as to generate a reaction force against a depression force applied to the brake pedal by a driver. The reaction force changing mechanism generates a reaction force against a depression force applied to the brake pedal by the driver, and is able to change a magnitude of the reaction force in advance according to the driver.

Accordingly, the brake device can generate the reaction force of the brake pedal by the reaction force generator provided in the housing, in a configuration in which the brake pedal and the hydraulic pressure generator are not mechanically connected. Furthermore, the brake device can change the reaction force characteristic of the brake pedal in advance according to the driver's preference by the reaction force changing mechanism. For example, a driver who prefers to step on the brake pedal easily can obtain an effect of reducing fatigue by setting the reaction force of the brake pedal to be small. A driver who prefers to precisely control the braking of the vehicle can obtain an effect of improving controllability by setting a large reaction force of the brake pedal. Note that "is able to change in advance" means that the change can be made before the braking operation of the vehicle is performed.

The reference numerals in parentheses attached to the components and the like indicate an example of correspondence between the components and the like and specific components and the like described in embodiments described below.

Embodiments of the present disclosure will now be described with reference to the drawings. In the following embodiments, the same or equivalent parts are denoted by the same reference numerals, and their descriptions will be omitted.

First Embodiment

A first embodiment will be described with reference to the drawings. A brake device of this embodiment is used in a brake-by-wire system mounted on a vehicle. First, an example of the configuration of the brake-by-wire system will be described.

As shown in FIG. 1, the brake-by-wire system 1 includes a brake circuit 10, an electronic control unit 20, and a brake device 30. The brake circuit 10 supplies hydraulic pressure to wheel cylinders 2 to 5 arranged on wheels respectively. The electronic control unit 20 controls the driving of the brake circuit 10. The brake device 30 has a brake pedal 31.

The brake circuit 10 has a first brake circuit 11 and a second brake circuit 12. The electronic control unit 20 has a first electronic control unit (ECU) 21 and a second ECU 22. Although FIG. 1 illustrates that the first ECU 21 and the second ECU 22 are configured as separate members, the first ECU 21 and the second ECU 22 may be configured integrally.

Of the wheel cylinders 2 to 5 arranged for the wheels respectively, the front left wheel cylinder 2 arranged for the front left wheel drives the brake pad of the front left wheel. The front right wheel cylinder 3 arranged for the front right wheel drives the brake pad of the front right wheel. The rear left wheel cylinder 4 arranged for the rear left wheel drives the brake pad of the rear left wheel. The rear right wheel cylinder 5 arranged for the rear right wheel drives the brake pad of the rear right wheel.

The first brake circuit 11 generates hydraulic pressure according to a control signal from the first ECU 21. The first brake circuit 11 increases the hydraulic pressure to increase the hydraulic pressure for the wheel cylinders 2 to 5 via the second brake circuit 12. Specifically, the first brake circuit 11 of this embodiment includes a reservoir 13, a brake pump 14, a brake circuit motor 15, and a pressure sensor 16.

The reservoir 13 stores brake fluid. The brake circuit motor 15 is rotationally driven by a drive signal from the first ECU 21 and transmits the torque to the brake pump 14. The brake pump 14 is driven by torque transmission from the brake circuit motor 15 and increases the pressure of the brake fluid supplied from the reservoir 13. The brake circuit motor 15 and the brake pump 14 correspond to a hydraulic pressure generator that generates hydraulic pressure in the brake circuit 10. The hydraulic pressure of the brake fluid increased by driving the brake pump 14 is supplied from the first brake circuit 11 to the second brake circuit 12. The pressure sensor 16 outputs a signal corresponding to the hydraulic pressure of the brake fluid flowing through the first brake circuit 11 to the first ECU 21.

The second brake circuit 12 performs a normal control, an anti-lock braking system (ABS) control, a vehicle stability control (VSC) control, etc. by controlling the hydraulic pressure for each wheel cylinder 2 to 5 according to the control signal from the second ECU 22.

The power source 23 supplies electric power to the first ECU 21, the second ECU 22, and the like. The first ECU 21 controls driving of the brake circuit motor 15 of the first brake circuit 11. The first ECU 21 has a first microcomputer 210 and a first drive circuit 211. The first microcomputer 210 includes: a calculator 212 configured by a CPU; a memory 213 configured by a non-transitional tangible storage medium, and a communication unit 214 to communicate with a second microcomputer 220 and a sensor 16, 32, which will be described later. The first microcomputer 210 outputs a drive signal to the first drive circuit 211. The first drive circuit 211 includes a switching element (not shown) and the like, and supplies power to the brake circuit motor 15 based on a drive signal from the first microcomputer 210 to drive the first brake circuit 11.

The second ECU 22 controls driving of the second brake circuit 12. The second ECU 22 has a second microcomputer 220 and a second drive circuit 221. The second microcomputer 220 includes a calculator 222 configured by a CPU, a memory 223 configured by a non-transitional tangible storage medium, and a communication unit 224 to communicate with the first microcomputer 210 and the sensor 16, 32. The second microcomputer 220 outputs a drive signal to the second drive circuit 221. The second drive circuit 221 includes a switching element (not shown) and the like, and drives an electromagnetic valve and a motor (not shown) of the second brake circuit 12 based on a drive signal from the second microcomputer 220.

The brake device 30 includes a brake pedal 31 that is operated by a driver's stepping force, and a sensor 32 that outputs a signal corresponding to the stroke amount of the brake pedal 31. The configuration of the brake device 30 will be described later in detail.

A sensor power wiring 321, a sensor ground wiring 322, a first output wiring 323 and a second output wiring 324 are connected to the sensor 32 of the brake device 30. Each of the sensor power wiring 321, the sensor ground wiring 322, and the first output wiring 323 connects the first ECU 21 and the sensor 32. The second output wiring 324 connects the second ECU 22 and the sensor 32. Thereby, the signal output from the sensor 32 is output to the first ECU 21 and the second ECU 22. In FIG. 1, both the sensor power wiring 321 and the sensor ground wiring 322 connect the first ECU 21 and the sensor 32, but not limited to this. The sensor power wiring 321 and the sensor ground wiring 322 may connect the second ECU 22 and the sensor 32.

Next, the operation of the brake-by-wire system 1 will be explained.

When the driver of the vehicle applies a pedaling force to the brake pedal 31 and operates the brake pedal 31, a signal corresponding to the stroke amount of the brake pedal 31 is output from the sensor 32 to the first ECU 21 and the second ECU 22. The stroke amount of the brake pedal 31 is also called the amount of depression or the amount of operation of the brake pedal 31.

The first ECU 21 drives the brake circuit motor 15 to decelerate the vehicle. When the rotation speed of the brake circuit motor 15 increases, the brake pump 14 increases the hydraulic pressure of the brake fluid supplied from the reservoir 13. The hydraulic pressure of the brake fluid is transmitted from the first brake circuit 11 to the second brake circuit 12.

The second ECU 22 executes the normal control, the ABS control, the VSC control, or the like. The normal control is to perform braking according to the stroke amount of the brake pedal 31 of the driver. In the normal control, the second ECU 22 controls the electromagnetic valve of the second brake circuit 12, such that the hydraulic pressure is supplied from the first brake circuit 11 to the wheel cylinders 2 to 5 via the second brake circuit 12. Therefore, the brake pad driven by the respective wheel cylinder 2 to 5 comes into frictional contact with the corresponding brake disc, braking the wheel, thereby decelerating the vehicle.

For example, the second ECU 22 calculates the slip ratio of the front left wheel, the front right wheel, the rear left wheel, and the rear right wheel based on the speed of each wheel and the speed of the vehicle, and executes the ABS control based on the calculation results. In the ABS control, the hydraulic pressure supplied to each wheel cylinder 2 to 5 is adjusted to prevent each wheel from locking.

For example, the second ECU 22 calculates the side slip state of the vehicle based on the yaw rate, the steering angle, the acceleration, the wheel speed, the vehicle speed, etc., and performs the VSC control based on the calculation results. In the VSC control, a target wheel to be controlled for stabilizing the turning of the vehicle is selected, and the hydraulic pressure is increased in the wheel cylinder 2 to 5 corresponding to the selected wheel, thereby suppressing skidding of the vehicle. Thus, traveling of the vehicle is stabilized.

In addition to the normal control, the ABS control, and the VSC control described above, the second ECU 22 may perform a collision avoidance control, a regenerative cooperative control, and the like based on signals from other ECUs (not shown).

Next, the brake device 30 used in the brake-by-wire system 1 will be described.

Figure 2:
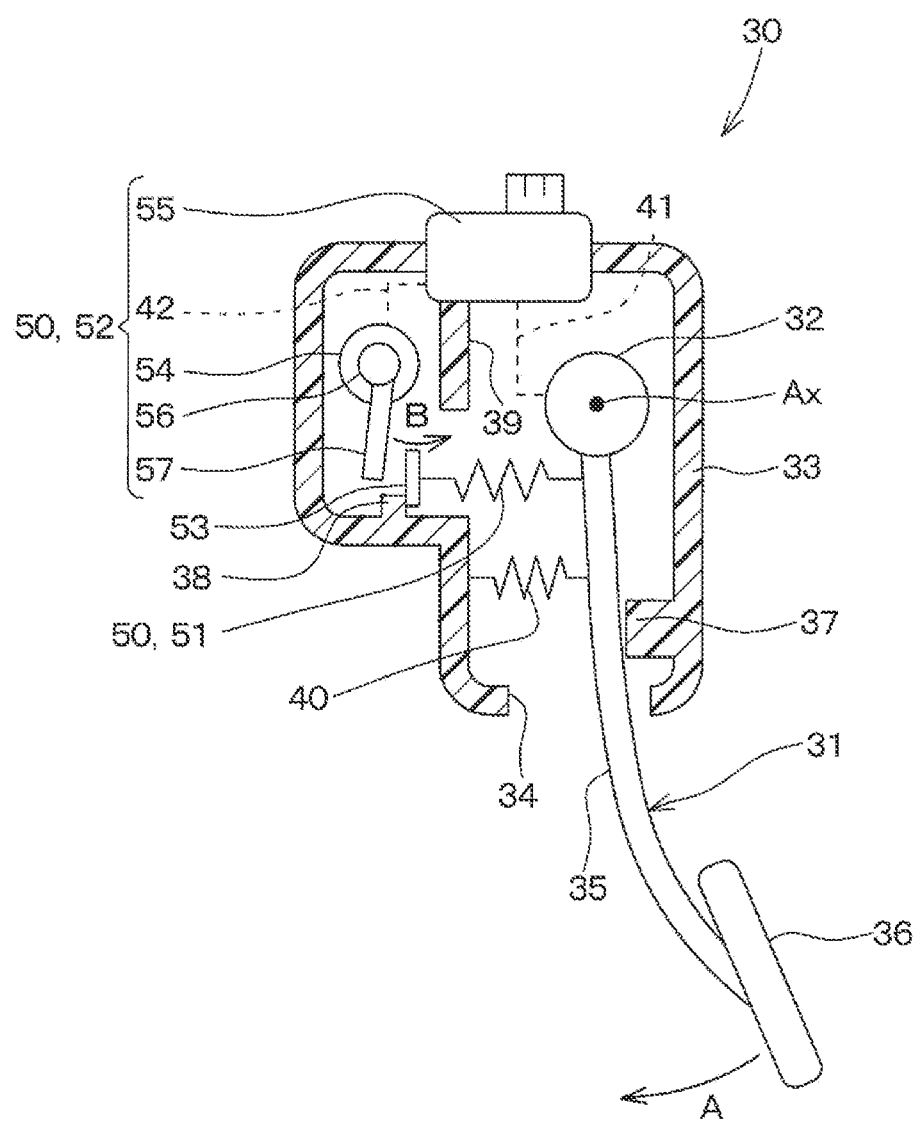
FIG. 2 is a cross-sectional view of the brake device according to the first embodiment.

As shown in FIG. 2, the brake device 30 includes a housing 33, a brake pedal 31, a sensor 32, a first spring 40 as a reaction force generator, and a reaction force changing mechanism 50.

The housing 33 constitutes an outer shell of the brake device 30. A space is formed inside the housing 33 to house a part of the brake pedal 31, the sensor 32, the first spring 40, the reaction force changing mechanism 50, and the like. The housing 33 has an opening 34 through which the brake pedal 31 is inserted. The housing 33 is attached to a part of the vehicle body in front of the cabin. Specifically, the housing 33 is attached to, for example, a dash panel, which is a partition wall that separates the outside of the vehicle such as an engine compartment of the vehicle from the cabin. The dash panel is sometimes called a bulkhead.

The brake pedal 31 has an arm portion 35 and a pedal portion 36. One longitudinal side of the arm portion 35 is arranged inside the housing 33, and the end portion thereof is rotatably provided on the housing 33. The other side of the arm portion 35 in the longitudinal direction extends outward from the opening 34 of the housing 33, and the pedal portion 36 is provided at the end portion thereof. When the pedaling force of the driver is applied to the pedal portion 36, the pedal portion 36 and the arm portion 35 move and rotate in the arrow direction A about the rotational axis Ax at the one side of the arm portion 35 in the longitudinal direction. Thus, the brake pedal 31 is operated by the driver's stepping force applied to the pedal portion 36. Although illustration is omitted, the brake pedal 31 may be configured to move in the vehicle front-rear direction instead of rotating around the rotational axis Ax or together with the rotating motion.

The sensor 32 outputs a signal corresponding to the stroke amount of the brake pedal 31 to the first ECU 21 and the second ECU 22. In this embodiment, the sensor 32 outputs a signal corresponding to the stroke amount of the brake pedal 31 to the first ECU 21 and the second ECU 22 via a motor control circuit 55, which will be described later. The sensor 32 of this embodiment is an angle sensor that detects the rotation angle of the brake pedal 31 as the stroke amount of the brake pedal 31. The sensor 32 is arranged at the rotational axis Ax of the arm portion 35 and outputs a voltage signal corresponding to the rotation angle of the brake pedal 31. The sensor 32 may be, for example, a magnetic angle sensor using a Hall IC or the like. Note that the angle sensor is not limited to this, and may be of a mechanical or optical type. Alternatively, the sensor 32 is not limited to detecting the rotation angle of the brake pedal 31 as the stroke amount of the brake pedal 31, and may detect the translational movement amount of the brake pedal 31.

In the brake device 30 of this embodiment, a hydraulic pressure generator that generates hydraulic pressure in the brake circuit 10 is not mechanically connected to the brake pedal 31. Therefore, the brake device 30 includes the first spring 40 as a reaction force generator for generating reaction force against the driver's depression force applied to the brake pedal 31 (hereinafter simply referred to as "reaction force of the brake pedal 31"). The first spring 40 is a compression coil spring and is provided inside the housing 33. Specifically, the first spring 40 has one end connected to the arm portion 35 of the brake pedal 31 and the other end connected to the inner wall of the housing 33. As the first spring 40, for example, it is possible to adopt an arbitrary spring, such as an equal-interval spring, an unequal-interval spring, a two-step spring, etc., according to the required pedaling force characteristics. The first spring 40 urges the brake pedal 31 rearward in the cabin (that is, toward the driver seated on the driver's seat).

A stopper 37 is provided at a part of the inner wall of the housing 33 behind the brake pedal 31 in the cabin. The arm portion 35 of the brake pedal 31 and the stopper 37 are brought into contact with each other when no force is applied to the brake pedal 31. That is, the stopper 37 determines the reference position of the brake pedal 31 when no force is applied to the brake pedal 31.

Furthermore, in this embodiment, the reaction force changing mechanism 50 is provided to change the reaction force characteristic of the brake pedal 31. The reaction force changing mechanism 50 has a second spring 51 as an elastic member and a position changing portion 52.

The second spring 51 is a compression coil spring and is provided inside the housing 33. One end of the second spring 51 is connected to the arm portion 35 of the brake pedal 31. A support plate 53 is fixed to the other end of the second spring 51. The support plate 53 is locked to a locking portion 38 provided on the inner wall of the housing 33. The second spring 51, like the first spring 40, urges the brake pedal 31 rearward in the cabin (that is, toward the driver seated on the driver's seat). That is, the second spring 51 also generates a reaction force of the brake pedal 31 like the first spring 40. The elastic force of the second spring 51 is set smaller than the elastic force of the first spring 40. Therefore, the reaction force generated by the second spring 51 is smaller than the reaction force generated by the first spring 40.

The position changing portion 52 has an electric motor 54 that is driven by electric energization, and a motor control circuit 55 that controls driving of the electric motor 54.

Figure 3:
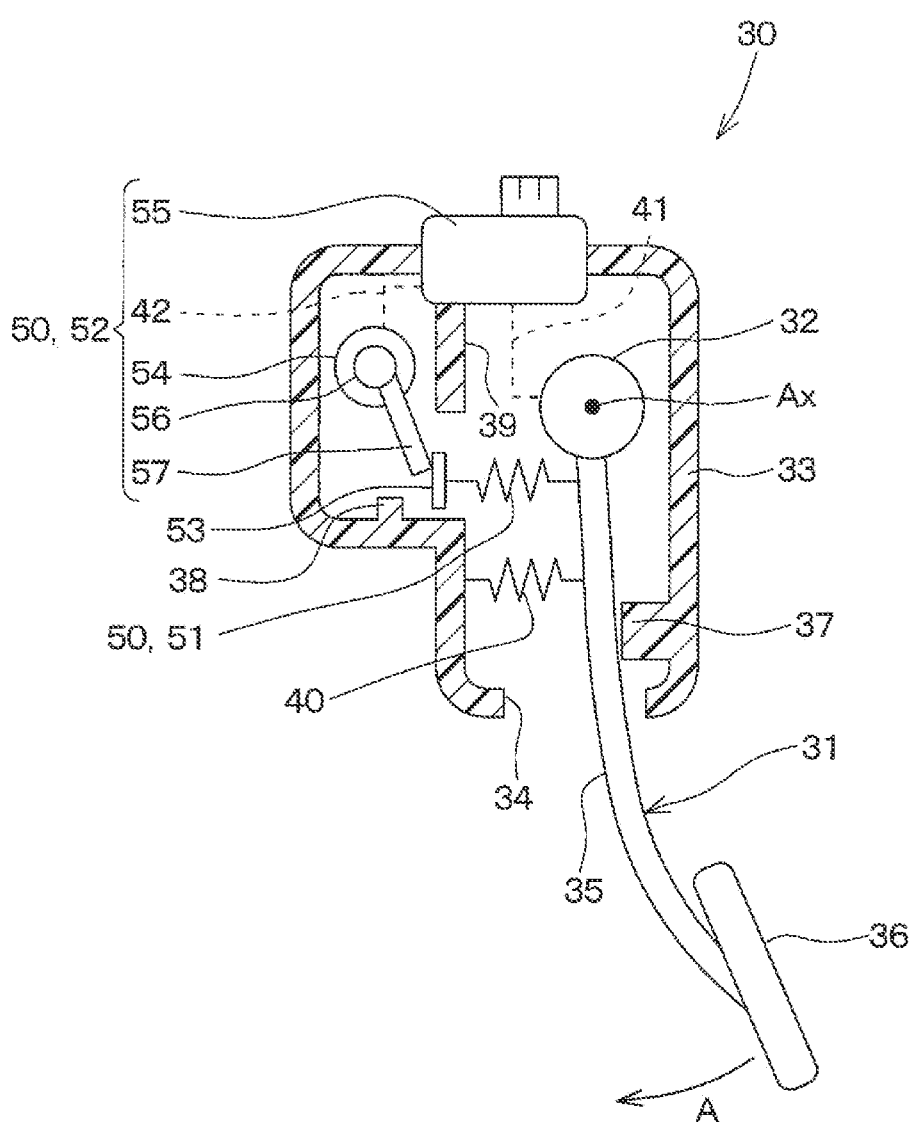
FIG. 3 is a cross-sectional view of the brake device according to the first embodiment, showing a state in which a pedaling force is being changed.

A lever 57 is provided on the shaft 56 of the electric motor 54. When the electric motor 54 is driven, the lever 57 rotates in the arrow direction B in FIG. 2. Then, as shown in FIG. 3, the lever 57 moves toward the brake pedal 31. Thereby, the electric motor 54 can change the preset position of the end of the second spring 51 opposite to the brake pedal 31 (that is, the support plate 53). Thereby, the magnitude of the preset load of the second spring 51 is changed. A partition wall 39 is provided between the electric motor 54 and the sensor 32 in the housing 33.

The motor control circuit 55 has a microcomputer (not shown) and a motor drive circuit (not shown). Although not shown, the microcomputer of the motor control circuit 55 includes a calculator configured by a CPU, a memory configured by a non-transitional tangible storage medium, and a communication unit for communicating with the sensor 32 and the like. The motor drive circuit of the motor control circuit 55 includes a switching element and the like, and drives the electric motor 54 based on a drive signal from the microcomputer. In FIGS. 2 and 3, a wiring between the motor control circuit 55 and the sensor 32 is indicated by a dashed line 41, and a wiring between the motor control circuit 55 and the electric motor 54 is indicated by a dashed line 42.

The first ECU 21 and the second ECU 22 that control the driving of the brake circuit 10 of the brake-by-wire system 1 may be configured as separate members separate from the motor control circuit 55 or may be integrally configured.

Figure 4:
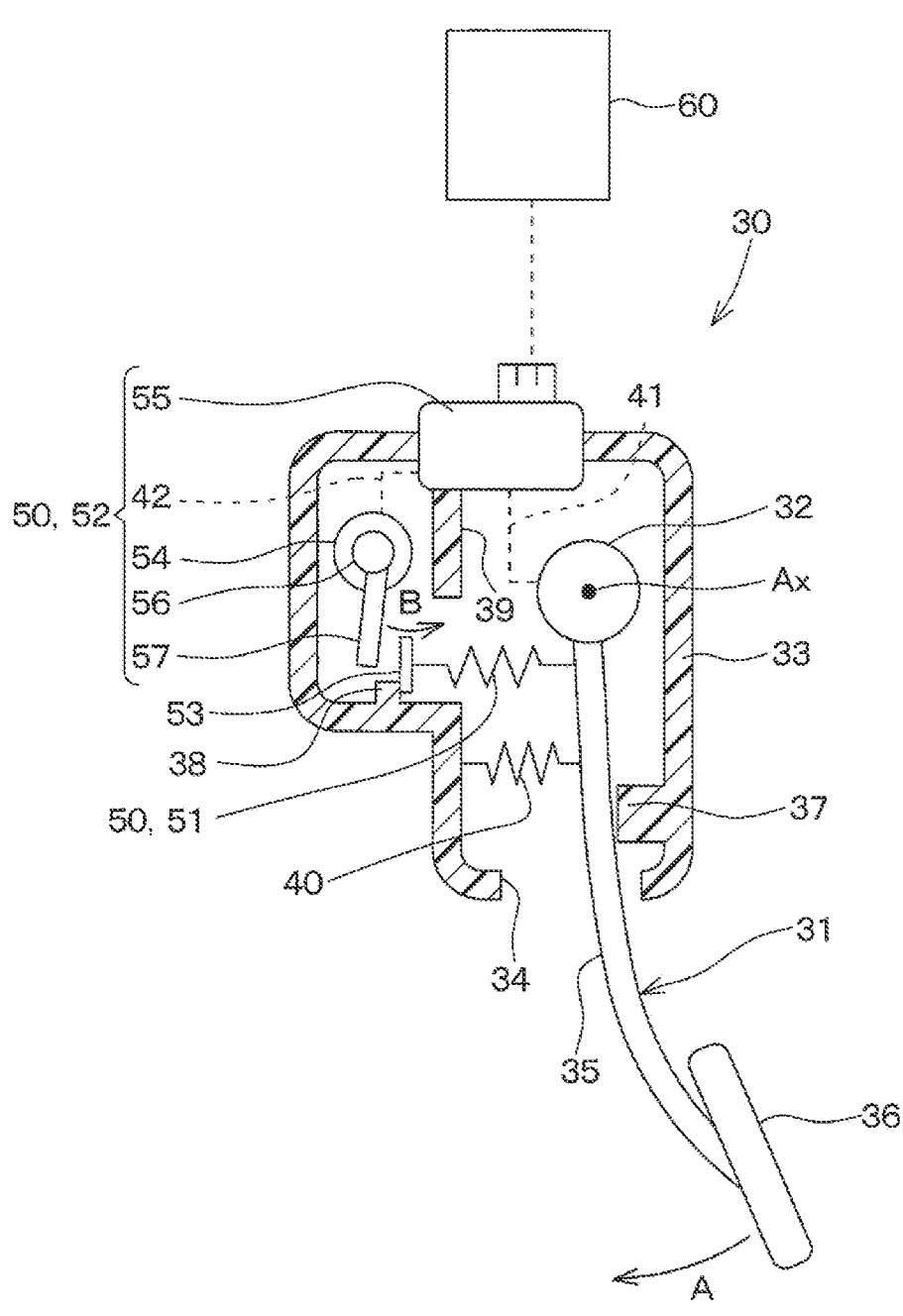
FIG. 4 is a cross-sectional view of the brake device according to the first embodiment, which includes a switch mechanism.

As shown in FIG. 4, the motor control circuit 55 receives an output signal from a switch mechanism 60 operated by a driver. In FIG. 4, a wiring between the motor control circuit 55 and the switch mechanism 60 is indicated by a dashed line 61. The switch mechanism 60 may be installed, for example, in a place where the driver can operate, such as an instrument panel of the vehicle, or a dedicated application may be installed in a smart phone carried by the driver. The driver can select whether or not to change the reaction force of the brake pedal 31 by operating the switch mechanism 60. Furthermore, the driver can operate the switch mechanism 60 to adjust the magnitude of the reaction force of the brake pedal 31.

When information about the reaction force of the brake pedal 31 is input from the switch mechanism 60 to the motor control circuit 55, the motor control circuit 55 drives the electric motor 54 based on the information to change the reaction force of the brake pedal 31. In general, at each position of the pedal stroke, the reaction force of the brake pedal 31 has the same magnitude as the force applied to the brake pedal 31 by the driver. Therefore, in the following description, the reaction force of the brake pedal 31 may be referred to as pedal depression force.

Figure 5:
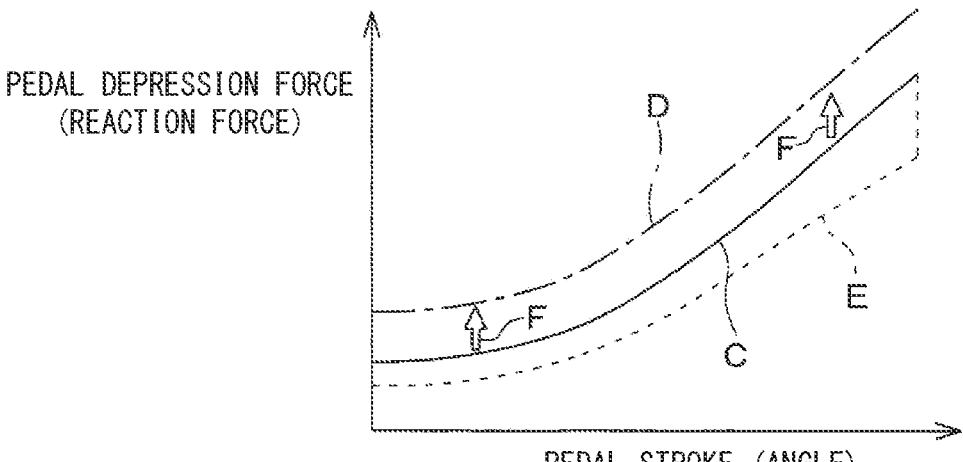
FIG. 5 is a graph showing an example of a relationship between a pedal stroke and a reaction force.

FIG. 5 shows an example relationship between the driver's depression force (that is, the reaction force of the brake pedal 31) and the stroke amount of the brake pedal 31. FIG. 5 shows an example in which a two-stage spring whose elastic force changes during the pedal stroke is used as the first spring 40 as the reaction force generator.

The solid line C in FIG. 5 indicates the pedaling force characteristics in the pedal depression direction when the reaction force of the brake pedal 31 is not changed (that is, when the support plate 53 provided at the end of the second spring 51 is locked by the locking portion 38). Hereinafter, this pedaling force characteristic will be referred to as a "reference pedaling force characteristic". The line D in FIG.

5 indicates the pedaling force characteristic in the pedal depression direction when the reaction force of the brake pedal 31 is changed by the reaction force changing mechanism 50 as shown in FIG. 3. The state shown in FIG. 3 in which the reaction force of the brake pedal 31 is changed by the reaction force changing mechanism 50 means that the preset position of the support plate 53 provided at the end of the second spring 51 is changed by the electric motor 54. The dashed line E in FIG. 5 indicates the pedaling force characteristic in the pedal return direction.

In the example shown in FIG. 5, as indicated by the blank arrow F, the reaction force changing mechanism 50 uniformly increases the pedaling force with respect to the reference pedaling force characteristic over the entire pedal stroke. That is, the motor control circuit 55 of the reaction force changing mechanism 50 drives the electric motor 54 so that the pedal effort increases uniformly with respect to the reference effort characteristic over the entire pedal stroke. The motor control circuit 55 can arbitrarily adjust the amount of increase in the pedal force with respect to the reference force characteristic in accordance with information input from the switch mechanism 60 operated by the driver. Therefore, the reaction force changing mechanism 50 can arbitrarily change the pedaling force (that is, the reaction force of the brake pedal 31) according to the driver's preference.

Further, the reaction force changing mechanism 50 can set arbitrarily the amount of increase in the pedal force according to the stroke amount of the brake pedal 31 transmitted from the sensor 32, due to the motor control circuit 55 and the electric motor 54, without being limited to the pedaling force characteristic illustrated in FIG. 5.

For example, when the stroke amount of the brake pedal 31 is small, the motor control circuit 55 may relatively reduce the increase amount of the pedal effort with respect to the reference effort characteristic. In this case, the motor control circuit 55 may gradually increase the amount of increase in the pedal effort with respect to the reference effort characteristic as the stroke amount of the brake pedal 31 increases.

For example, when the stroke amount of the brake pedal 31 is small, the motor control circuit 55 may relatively increase the amount of increase in the pedal effort with respect to the reference effort characteristic. In this case, the motor control circuit 55 may gradually decrease the amount of increase in the pedal effort with respect to the reference effort characteristic as the stroke amount of the brake pedal 31 increases.

For example, the motor control circuit 55 can set the amount of increase in the pedal effort required at that time from numerical values such as pedal stroke, vehicle speed, and deceleration.

The brake device 30 of this embodiment has the following effects.

The brake device 30 of this embodiment generates a reaction force of the brake pedal 31 by the first spring 40 as a reaction force generator provided inside the housing 33. The reaction force changing mechanism 50 is configured to generate a reaction force of the brake pedal 31 and change the magnitude of the reaction force in advance according to the driver. The brake device 30 of this embodiment has a configuration in which the brake pedal 31 and the hydraulic pressure generator are not mechanically connected with each other.

Thus, the brake device 30 can form the reference pedaling force characteristic by generating the reaction force of the brake pedal 31 with the first spring 40 as the reaction force generator. The brake device 30 can change the reaction force characteristic of the brake pedal 31 in advance by the reaction force changing mechanism 50 according to the driver's preference. For example, a driver who prefers to step on the brake pedal 31 easily can set the reaction force of the brake pedal 31 to be small by setting the increase amount of the pedal effort with respect to the reference effort characteristic to 0 or small. As a result, the driver can obtain an effect of reducing fatigue. On the other hand, a driver who prefers to precisely control the braking of the vehicle can set a large reaction force of the brake pedal 31 by increasing the amount of increase in the pedal effort with respect to the reference effort characteristic. Thereby, this driver can obtain an effect of improving the controllability. Thus, the brake device 30 can set the reaction force according to the driver's preference.

Moreover, the brake device 30 of this embodiment can also have the following effects.

(1) The reaction force changing mechanism 50 of the brake device 30 has the second spring 51 as an elastic member and the position changing portion 52. The second spring 51 generates a reaction force against the driver's depression force applied to the brake pedal 31. The position changing portion 52 can change the preset position of the end of the second spring 51 opposite to the brake pedal 31.

Accordingly, the preset load of the second spring 51 can be changed by changing the preset position of the second spring 51 using the position changing portion 52. Therefore, the reaction force changing mechanism 50 can change the reaction force characteristic of the brake pedal 31.

(2) The position changing portion 52 of the reaction force changing mechanism 50 has the electric motor 54 that is driven by energization, and the motor control circuit 55 that controls driving of the electric motor 54.

Thus, by using the electric motor 54 and the motor control circuit 55 as the position changing portion 52, the preset position of the second spring 51 can be instantly adjusted to a preset value.

Further, by driving the electric motor 54 with the motor control circuit 55, it is possible to determine the necessary reaction force at that time from numerical values such as pedal stroke, vehicle speed, and deceleration.

(3) The motor control circuit 55 can drive the electric motor 54 so that the reaction force uniformly increases over the entire pedal stroke with respect to the reaction force characteristic generated by the first spring 40 (that is, the reference pedaling force characteristic).

Thus, the brake device 30 can set the reaction force of the brake pedal 31 without giving the driver a sense of discomfort.

(4) The brake device 30 further includes the switch mechanism 60 that can be operated by the driver to change the magnitude of the reaction force of the brake pedal 31.

Accordingly, the driver can set the reaction force of the brake pedal 31 in advance by operating the switch mechanism 60 before driving or braking the vehicle.

Second Embodiment

A second embodiment will be described. The second embodiment is similar to the first embodiment except for a part of the configuration modified from the corresponding configuration of the first embodiment. Accordingly, only parts different from the corresponding parts of the first embodiment are described.

Figure 6:
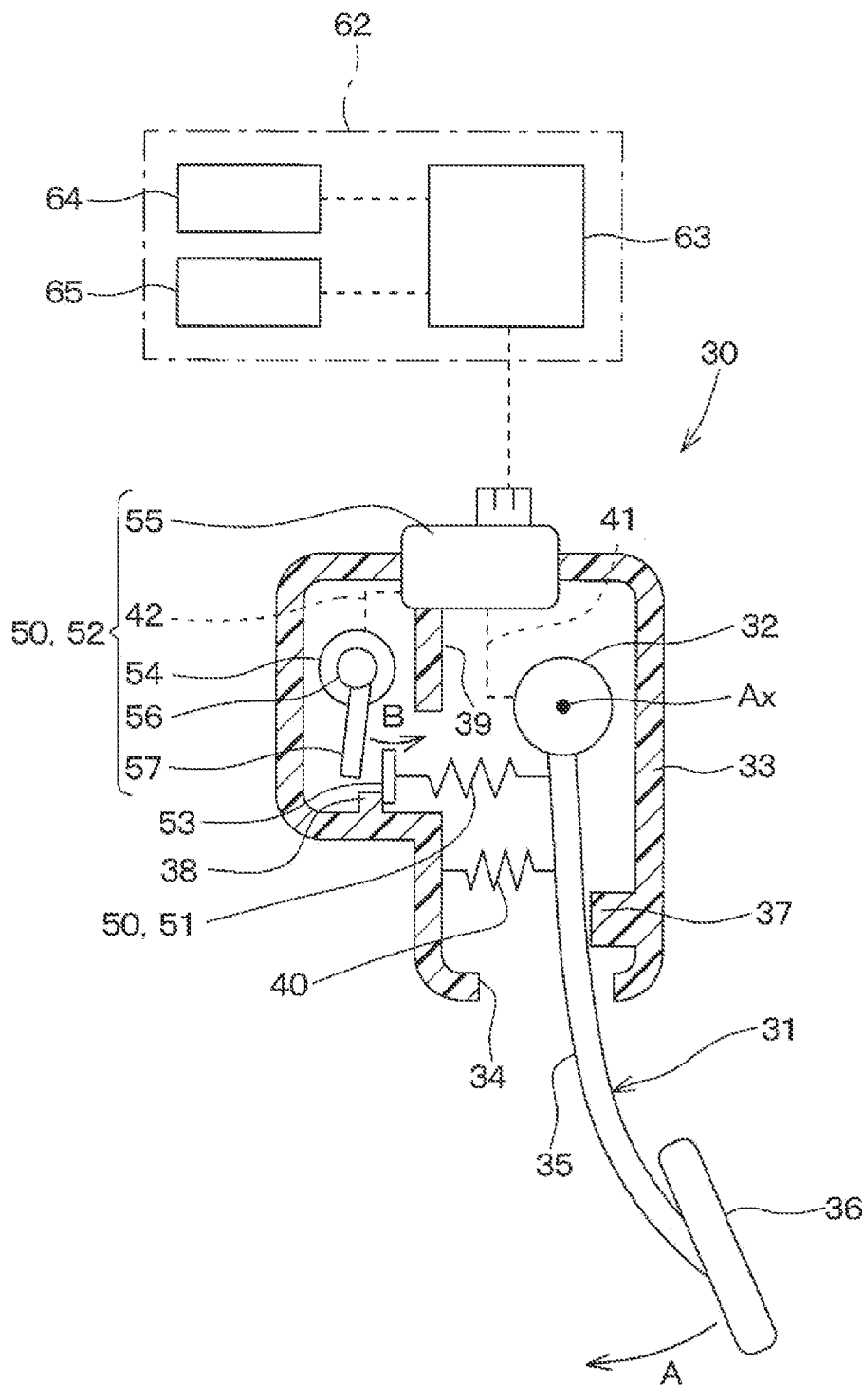
FIG. 6 is a cross-sectional view of a brake device according to a second embodiment.

As shown in FIG. 6, a vehicle equipped with the brake device 30 of the second embodiment has a driver recognition device 62 to recognize a driver who gets into the vehicle. The driver recognition device 62 includes an ECU 63 having a function of recognizing the driver, and further includes a vehicle key 64 carried by the driver, or an in-vehicle camera 65 that captures the driver seat on the driver's seat. This ECU 63 recognizes the driver based on the information input from the vehicle key 64. Alternatively, the ECU 63 recognizes the driver based on information input from the in-vehicle camera 65 using image recognition technology or the like. Information about the driver recognized by the ECU 63 is input to the motor control circuit 55. The motor control circuit 55 is configured to automatically adjust the output torque of the electric motor 54 according to information regarding the driver. That is, the motor control circuit 55 automatically adjusts the reaction force of the brake pedal 31 according to the preferences of the driver who gets into the vehicle. For example, the motor control circuit 55 sets the reaction force of the brake pedal 31 to be small for a driver who prefers to step on the brake pedal 31 easily. Also, for example, the motor control circuit 55 sets a large reaction force of the brake pedal 31 for a driver who prefers to precisely control the braking of the vehicle.

The second embodiment also has the same effect as the first embodiment from the same configuration as the first embodiment. Furthermore, the second embodiment can have the following effects.

(1) The motor control circuit 55 of the second embodiment is configured to automatically adjust the magnitude of the reaction force of the brake pedal 31 according to the driver recognized by the driver recognition device 62.

Thus, when the driver gets into the vehicle, the reaction force of the brake pedal 31 is automatically adjusted, so that the driver can save the operation of adjusting the reaction force of the brake pedal 31 each time he/she gets in the vehicle.

Third Embodiment

A third embodiment will be described. In the third embodiment, the reaction force changing mechanism 50 is modified relative to the first embodiment and the like. The other portions are similar to the first embodiment and the like, so only parts different from the first embodiment are described.

Figure 7:
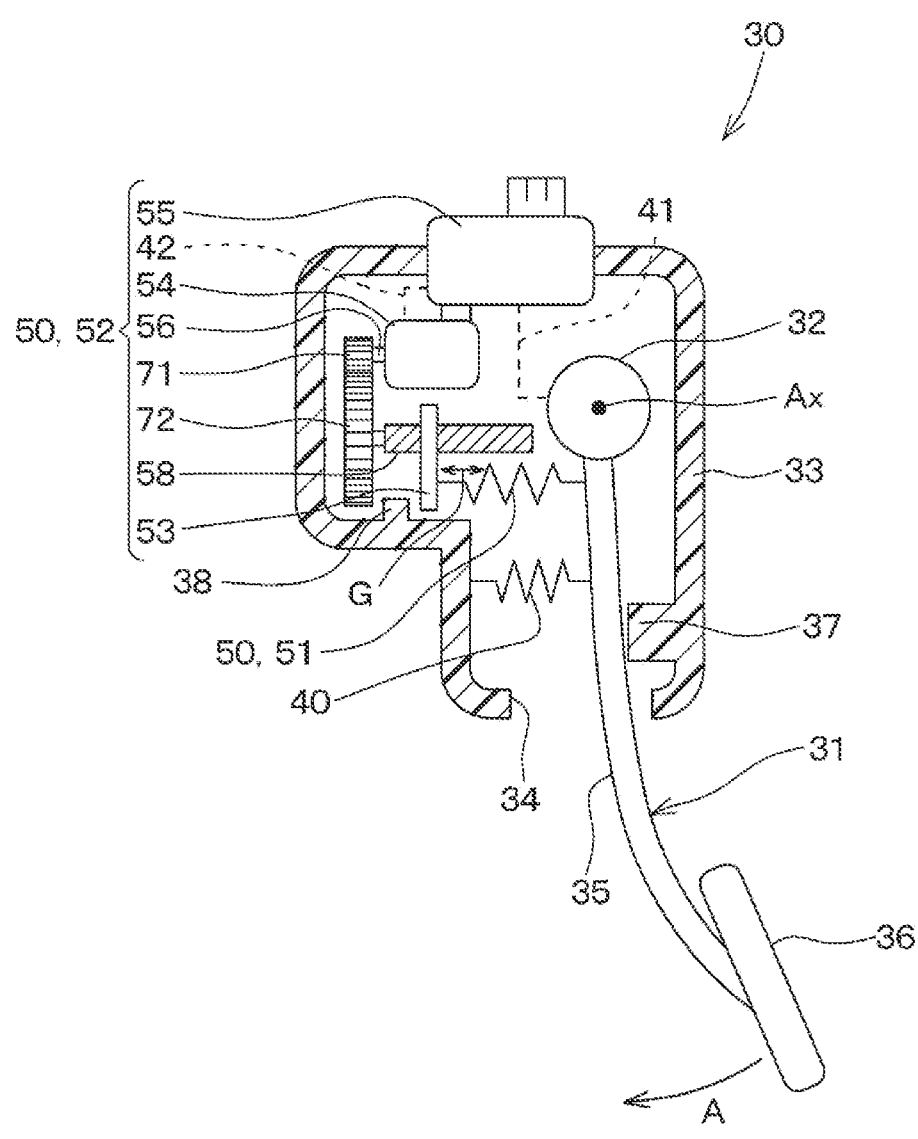
FIG. 7 is a cross-sectional view of a brake device according to a third embodiment.

As shown in FIG. 7, in the third embodiment, the reaction force changing mechanism 50 provided in the brake device 30 includes a second spring 51 as an elastic member and a position changing portion 52 for changing the set position of the second spring 51. The position changing portion 52 has a motor control circuit 55, an electric motor 54, a screw 58 and a support plate 53.

A first gear 71 is provided on the shaft 56 of the electric motor 54. The first gear 71 meshes with the second gear 72. The screw 58 is provided at the rotation center of the second gear 72. The screw 58 is engaged with a female thread (not shown) provided on the support plate 53. Note that the first gear 71 and the second gear 72 constitute a reduction mechanism for increasing the torque of the electric motor 54 and transmitting the torque to the screw 58.

In the above configuration, when the electric motor 54 rotates due to the drive signal from the motor control circuit 55, the torque is transmitted from the first gear 71 to the second gear 72. When the screw 58 rotates around the axis together with the second gear 72, as indicated by the arrow G, the support plate 53 moves in the extension/contraction direction of the second spring 51. Thereby, the position changing portion 52 can change the preset position of the end of the second spring 51 opposite to the brake pedal 31 (that is, the support plate 53). Thereby, the magnitude of the preset load of the second spring 51 is changed.

The third embodiment also has the same effect as the first embodiment from the same configuration as the first embodiment. Furthermore, the third embodiment can have the following effects.

(1) The position changing portion 52 of the brake device 30 of the third embodiment has the motor control circuit 55, the electric motor 54, the screw 58, and the support plate 53. The screw 58 is driven by the electric motor 54 to rotate about its axis, and the rotation of the screw 58 causes the support plate 53 to move in the extension/contraction direction of the second spring 51.

Accordingly, the preset position of the second spring 51 can be held by using the screw 58 as the position changing portion 52. That is, power for holding the preset position is not required since the efficiency for turning the screw mechanism is low in the opposite direction. Therefore, according to the configuration of the position changing portion 52 of the brake device 30 of the third embodiment, power consumption of the electric motor 54 can be reduced.

Fourth Embodiment

A fourth embodiment will be described. The fourth embodiment is a modification of the third embodiment.

Figure 8:
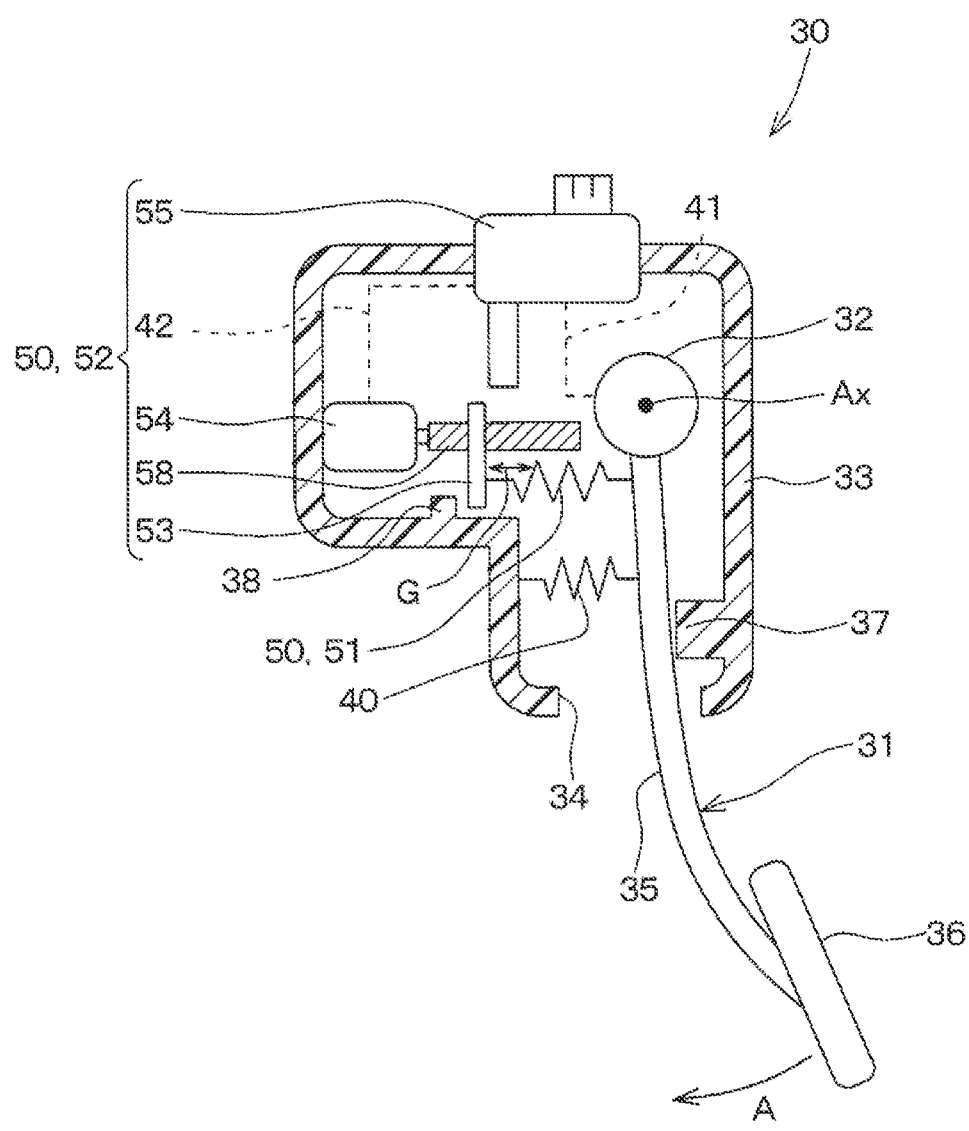
FIG. 8 is a cross-sectional view of a brake device according to a fourth embodiment.

As shown in FIG. 8, the position changing portion 52 of the reaction force changing mechanism 50 has the motor control circuit 55, the electric motor 54, the screw 58, and the support plate 53 in the fourth embodiment. The electric motor 54 is provided so as to rotate the screw 58 around its axis without using a reduction mechanism. Therefore, when the electric motor 54 rotates due to the drive signal from the motor control circuit 55, the torque is directly transmitted to the screw 58. When the screw 58 rotates around its axis, as indicated by the arrow G, the support plate 53 moves in the extension/contraction direction of the second spring 51. Thereby, the position changing portion 52 can change the preset position of the end of the second spring 51 opposite to the brake pedal 31 (that is, the support plate 53). Thereby, the magnitude of the preset load of the second spring 51 is changed.

The fourth embodiment has the same effect as the first embodiment from the same configuration as the first embodiment. Furthermore, the fourth embodiment can be simplified in configuration by eliminating the reduction mechanism in comparison with the third embodiment.

Fifth Embodiment

A fifth embodiment will be described. In the fifth embodiment, the reaction force changing mechanism 50 is modified relative to the first embodiment and the like. The other portions are similar to the first embodiment and the like, so only parts different from the first embodiment are described.

Figure 9:
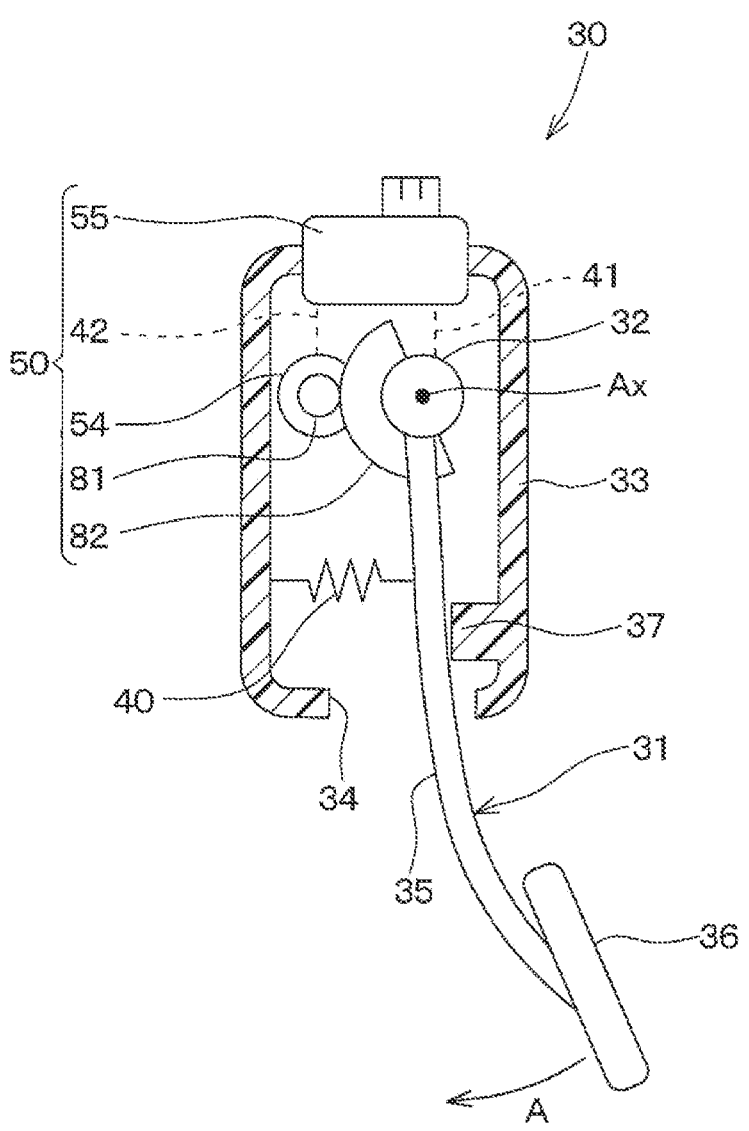
FIG. 9 is a cross-sectional view of a brake device according to a fifth embodiment.

As shown in FIG. 9, in the fifth embodiment, the reaction force changing mechanism 50 of the brake device 30 has the motor control circuit 55, the electric motor 54, a first gear 81 and a second gear 82. The first gear 81 is provided at the shaft of the electric motor 54. The second gear 82 is provided at the rotational axis Ax of the brake pedal 31. The first gear 81 and the second gear 82 are in mesh with each other. The first gear 81 and the second gear 82 constitute a reduction mechanism for increasing the torque of the electric motor 54 and transmitting the torque to the brake pedal 31.

Note that the reaction force changing mechanism 50 of the fifth embodiment does not include the second spring as an elastic member. That is, the reaction force changing mechanism 50 of the fifth embodiment is configured such that the torque of the electric motor 54 is transmitted to the rotational axis Ax of the brake pedal 31 without passing through the second spring as an elastic member.

In the above configuration, when the electric motor 54 rotates due to the drive signal from the motor control circuit 55, the torque is transmitted from the first gear 81 to the second gear 82, and the torque is applied from the second gear 82 to the brake pedal 31. The torque acts as a reaction force acting in the opposite direction to the force applied to the brake pedal 31. Therefore, the motor control circuit 55 can arbitrarily change the reaction force of the brake pedal 31 by varying the current value applied to the motor.

The fifth embodiment has the same effect as the first embodiment from the same configuration as the first embodiment. Furthermore, the fifth embodiment can have the following effects.

(1) The reaction force changing mechanism 50 of the brake device 30 of the fifth embodiment includes the motor control circuit 55, the electric motor 54, and the reduction mechanism (that is, the first gear 81 and the second gear 82) that transmits the torque of the electric motor 54 to the rotational axis Ax of the brake pedal 31. The electric motor 54 outputs torque in the direction opposite to the depression force applied to the brake pedal 31 to the rotational axis Ax of the brake pedal 31 via the reduction mechanism.

In general, the driver's depression force applied to the brake pedal 31 is greater than the driver's depression force applied to the accelerator pedal. In case where the electric motor 54 of the reaction force changing mechanism 50 is downsized due to the reduction mechanism, the brake device 30 can apply the torque necessary for adjusting the reaction force of the brake pedal 31 to the rotational axis Ax of the brake pedal 31.

Furthermore, since the electric motor 54 applies torque to the rotational axis Ax of the brake pedal 31, instantaneous variable control of the reaction force becomes possible.

Sixth Embodiment

A sixth embodiment will be described. The sixth embodiment is a modification of the fifth embodiment.

Figure 10:
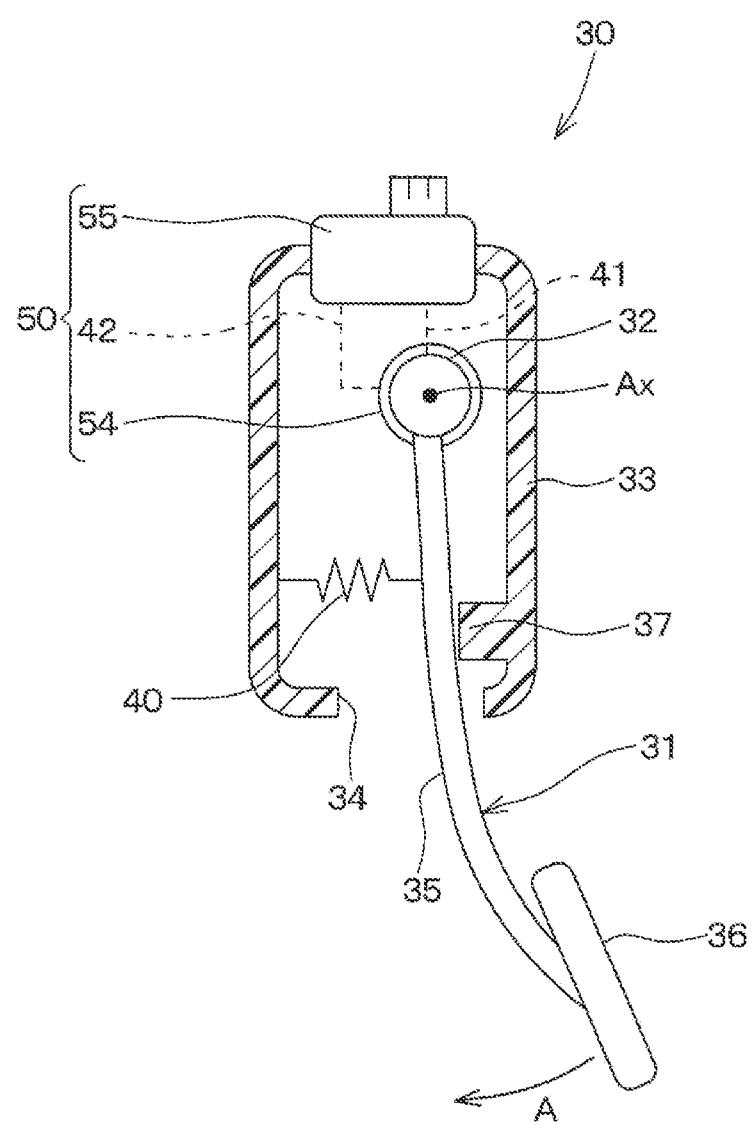
FIG. 10 is a cross-sectional view of a brake device according to a sixth embodiment.

As shown in FIG. 10, the reaction force changing mechanism 50 of the sixth embodiment has the motor control circuit 55 and the electric motor 54. The shaft of the electric motor 54 is arranged coaxially with the rotational axis Ax of the brake pedal 31. The electric motor 54 is provided so as to rotate the brake pedal 31 without a reduction mechanism. Therefore, when the electric motor 54 rotates due to the drive signal from the motor control circuit 55, the torque is directly transmitted to the brake pedal 31. The torque acts as a reaction force acting in the opposite direction to the force applied to the brake pedal 31. Therefore, the motor control circuit 55 can change the reaction force of the brake pedal 31 by varying the current value applied to the motor.

The sixth embodiment has the same effect as the first embodiment from the same configuration as the first embodiment. Furthermore, the sixth embodiment can be simplified in configuration by eliminating the reduction mechanism in comparison with the fifth embodiment. In addition, since the electric motor 54 directly applies torque to the rotational axis Ax of the brake pedal 31, instantaneous variable control of the reaction force becomes possible.

A reduction mechanism may be provided between the shaft 56 and the rotational axis Ax of the brake pedal 31 after the shaft 56 of the electric motor 54 and the rotational axis Ax of the brake pedal 31 are coaxially arranged as in the sixth embodiment.

Seventh Embodiment

A seventh embodiment will be described. In the seventh embodiment, the reaction force changing mechanism 50 is modified relative to the first embodiment and the like. The other portions are similar to the first embodiment and the like, so only parts different from the first embodiment are described.

Figure 11:
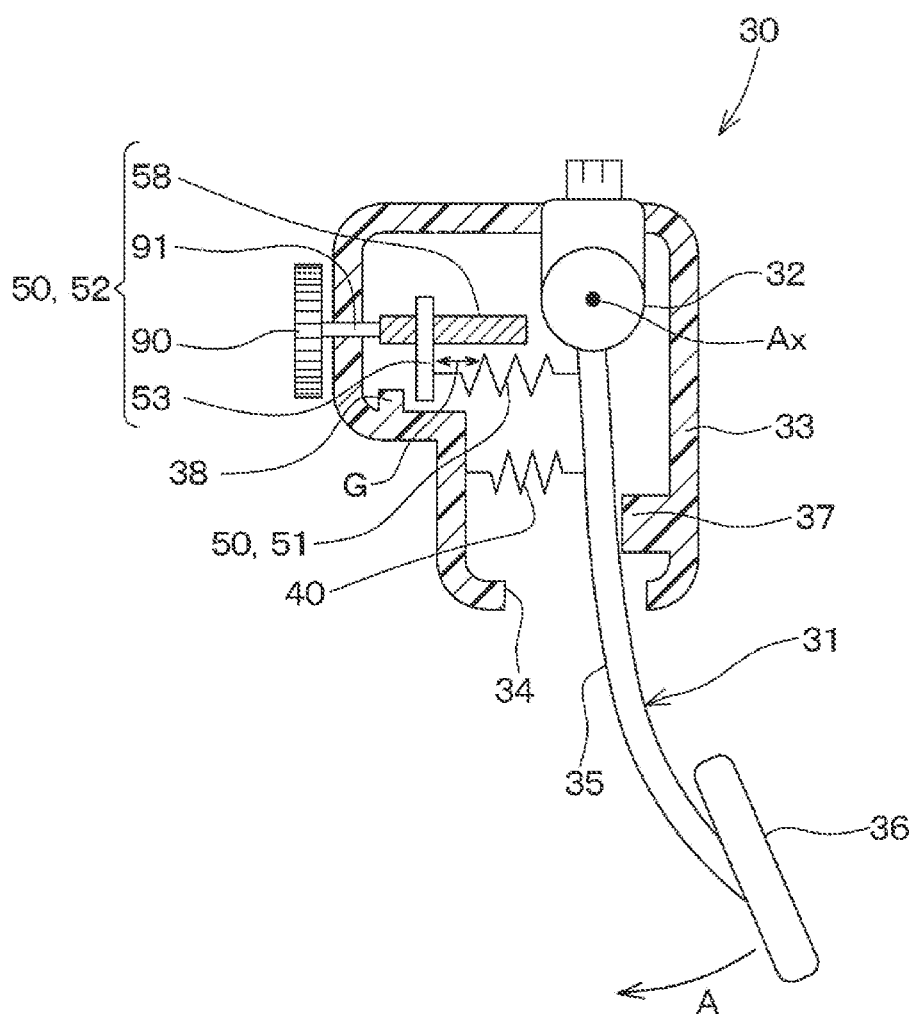
FIG. 11 is a cross-sectional view of a brake device according to a seventh embodiment.

As shown in FIG. 11, in the seventh embodiment, the reaction force changing mechanism 50 of the brake device 30 includes the second spring 51 as an elastic member and the position changing portion 52 for changing the set position of the second spring 51. The position changing portion 52 has the screw 58, an adjustment dial 90 and the support plate 53.

The screw 58 and the adjustment dial 90 are coaxially connected via a connecting portion 91. The connecting portion 91 is provided rotatably about the axis with respect to the housing 33. The adjustment dial 90 is provided outside the housing 33 and the screw 58 is provided inside the housing 33. The screw 58 is engaged with a female thread (not shown) provided on the support plate 53.

In the above configuration, the screw 58 is rotated about its axis by manually rotating the adjustment dial 90. As a result, as indicated by the arrow G, the support plate 53 moves in the extension/contraction direction of the second spring 51. Therefore, the position changing portion 52 can change the preset position of the end of the second spring 51 opposite to the brake pedal 31 (that is, the support plate 53). Therefore, the magnitude of the preset load of the second spring 51 is changed.

The seventh embodiment has the same effect as the first embodiment from the same configuration as the first embodiment. Furthermore, the seventh embodiment can have the following effects.

(1) The position changing portion 52 of the brake device 30 of the seventh embodiment has the screw 58, the adjustment dial 90, and the support plate 53. The screw 58 is manually rotatable about its axis, and the rotation of the screw 58 moves the support plate 53 in the extension/contraction direction of the second spring 51.

Since the electric motor 54 and the motor control circuit 55 are not used as the position changing portion 52, the manufacturing cost can be reduced. In addition, since the driver can manually adjust the reaction force of the brake pedal 31, intuitive fine adjustment by the driver is possible.

Eighth Embodiment

An eighth embodiment will be described hereafter. The eighth embodiment is a modification of the seventh embodiment.

Figure 12:
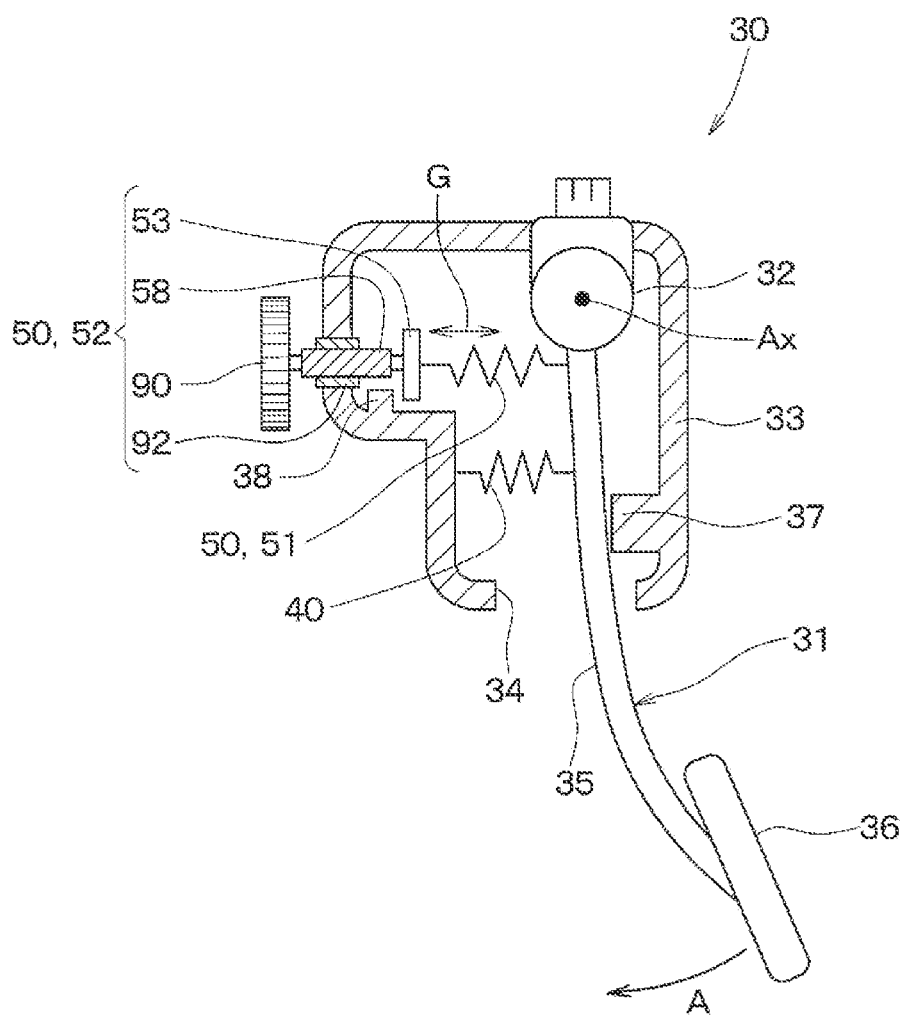
FIG. 12 is a cross-sectional view of a brake device according to an eighth embodiment.

As shown in FIG. 12, the position changing portion 52 of the reaction force changing mechanism 50 has the screw 58, the adjustment dial 90, and the support plate 53 in the eighth embodiment. The adjustment dial 90 is provided outside the housing 33. The screw 58 is connected to the adjustment dial 90 and engaged with a female thread 92 provided in the housing 33, part of which is provided inside the housing 33. The end of the screw 58 opposite to the adjustment dial 90 is in contact with the support plate 53.

In the above configuration, when the adjustment dial 90 is manually rotated, the screw 58 rotates around its axis and moves in the extension/retraction direction of the second spring 51. As a result, as indicated by the arrow G, the support plate 53 moves in the extension/contraction direction of the second spring 51. Therefore, the magnitude of the preset load of the second spring 51 is changed.

The eighth embodiment has the effect similar to that of the seventh embodiment.

Ninth Embodiment

A ninth embodiment will be described hereafter. In the ninth embodiment, a part of the configuration of the brake-by-wire system 1 using the brake device 30 is changed from the first embodiment and the like, and the rest is the same as the first embodiment and the like. Only parts different from the first embodiment and the like will be described.

Figure 13:
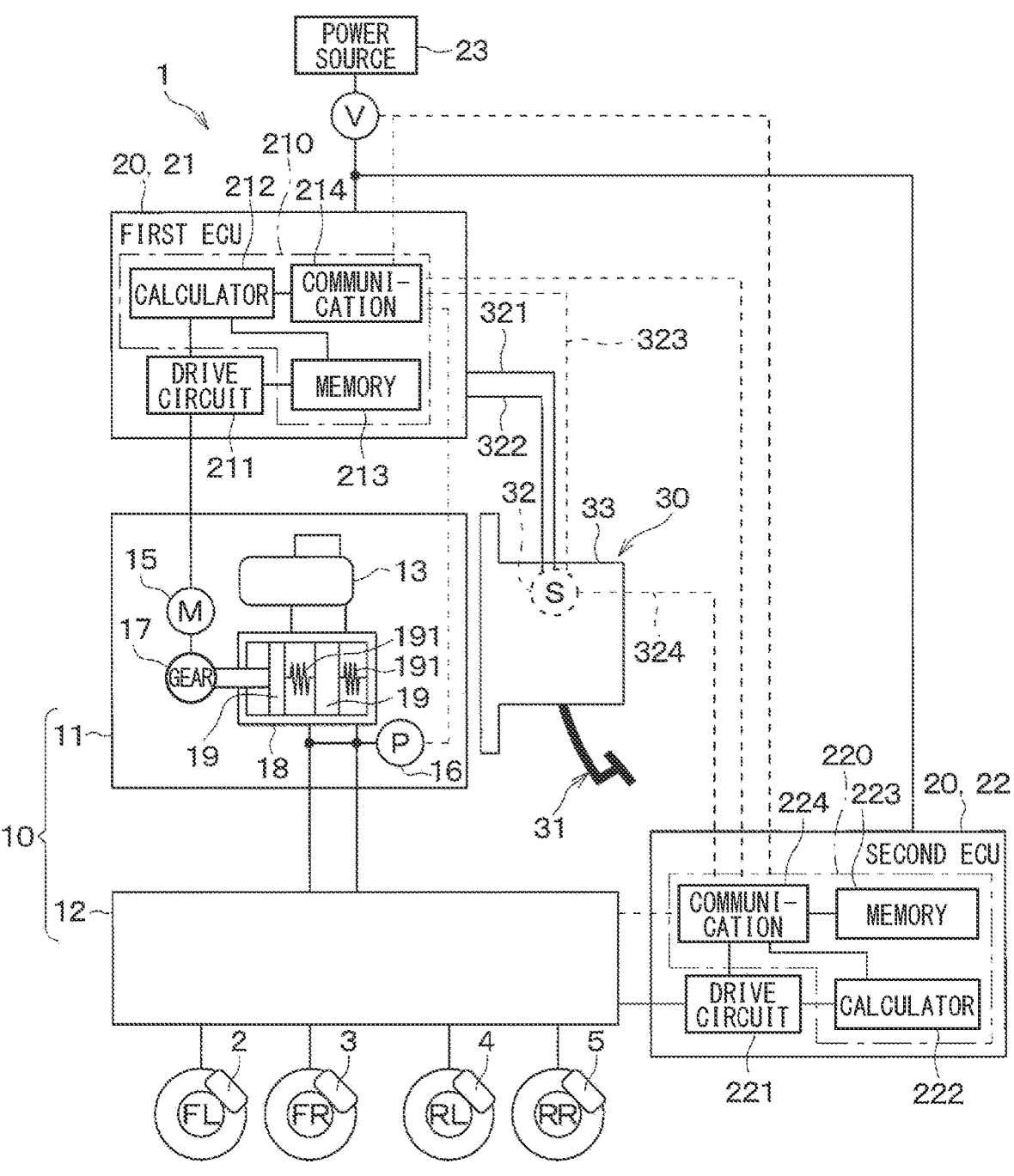
FIG. 13 is a configuration diagram of a brake-by-wire system using a brake device according to a ninth embodiment.

As shown in FIG. 13, in the brake-by-wire system 1 of the ninth embodiment, the configuration of the first brake circuit 11 is different from that described in the first embodiment. The first brake circuit 11 of the ninth embodiment has a reservoir 13, a brake circuit motor 15, a gear mechanism 17, a master cylinder 18, and a pressure sensor 16.

The reservoir 13 stores brake fluid. The brake circuit motor 15 is rotationally driven by a drive signal from the first ECU 21 and transmits the torque to the gear mechanism 17. The master cylinder 18 has a master piston 19 and a spring 191 inside. The gear mechanism 17 reciprocates the master piston 19 of the master cylinder 18 in the axial direction of the master cylinder 18. Movement of the master piston 19 increases the hydraulic pressure of the brake fluid supplied from the reservoir 13 to the master cylinder 18. The hydraulic pressure of the brake fluid is supplied from the first brake circuit 11 to the second brake circuit 12. The pressure sensor 16 outputs a signal corresponding to the hydraulic pressure of the brake fluid flowing through the first brake circuit 11 to the first ECU 21.

The master cylinder 18 and the master piston 19 of the ninth embodiment correspond to a hydraulic pressure generator that generates hydraulic pressure in the brake circuit 10. Also in the ninth embodiment, the master cylinder 18 and the master piston 19 are not mechanically connected to the brake pedal 31 of the brake device 30.

It is possible to apply the brake device 30 described in the first to eighth embodiments to the configuration of the brake-by-wire system 1 of the ninth embodiment.

The ninth embodiment has the same effect as the first embodiment and the like from the configuration substantially the same as the first embodiment and the like.

Other Embodiment

In the above embodiments, the brake device 30 includes the suspension type brake pedal 31, but the configuration is not limited to this. The brake device 30 may include an organ type brake pedal 31.

The present disclosure is not limited to the embodiments described above, and can be modified as appropriate.

The above embodiments are not independent of each other, and can be appropriately combined except when the combination is obviously impossible.

Further, in each of the embodiments, it goes without saying that components of the embodiment are not necessarily essential except for a case in which the components are particularly clearly specified as essential components, a case in which the components are clearly considered in principle as essential components, and the like.

Further, in each of the embodiments, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number.

In each of the embodiments, when the shape, positional relationship, and the like of the constituent elements and the like are referred to, the shape, the positional relationship, and the like are not limited unless otherwise specified or limited to specific shapes, positional relationships, and the like in principle.

The control unit and the method thereof described in the present disclosure may be realized by a dedicated computer provided by configuring a processor and a memory programmed to execute one or more functions embodied by a computer program. Alternatively, the control unit and the method described in the present disclosure may be implemented by a special purpose computer configured as a processor with one or more special purpose hardware logic circuits. Alternatively, the control unit and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

What is claimed is:

1. A brake device for a brake-by-wire system in which a hydraulic pressure generator is driven by an electronic control unit to generate hydraulic pressure in a brake circuit of a vehicle, the brake device comprising:

a housing attached to a body of the vehicle;

a brake pedal rotatably mounted on the housing and not mechanically connected to the hydraulic pressure generator;

a sensor configured to output a signal corresponding to a stroke amount of the brake pedal to the electronic control unit;

a reaction force generator having one end connected to the brake pedal and the other end connected to the housing so as to generate a reaction force against a depression force applied to the brake pedal by a driver; and a reaction force changing mechanism configured to generate a reaction force against a depression force applied to the brake pedal by the driver, wherein the reaction force changing mechanism is able to change a magnitude of the reaction force in advance according to the driver without change in an initial position of the brake pedal; and the reaction force changing mechanism includes:

an elastic member configured to generate a reaction force against a depression force applied to the brake pedal by the driver; and a position changing portion capable of changing a preset position of an end portion of the elastic member opposite to the brake pedal; wherein:

the one end of the reaction force generator is connected to the brake pedal at a first portion of the brake pedal at a first position;

the elastic member is connected to a second portion of the brake pedal at a second position;

the first and second positions are different from each other;

the brake pedal is configured to rotate about a rotational axis; and the second position is closer to the rotational axis than the first position.

2. A brake device for a brake-by-wire system in which a hydraulic pressure generator is driven by an electronic control unit to generate hydraulic pressure in a brake circuit of a vehicle, the brake device comprising:

a housing attached to a body of the vehicle;

a brake pedal rotatably mounted on the housing and not mechanically connected to the hydraulic pressure generator;

a sensor configured to output a signal corresponding to a stroke amount of the brake pedal to the electronic control unit;

a reaction force generator having one end connected to the brake pedal and the other end connected to the housing so as to generate a reaction force against a depression force applied to the brake pedal by a driver; and a reaction force changing mechanism configured to generate a reaction force against a depression force applied to the brake pedal by the driver, wherein the reaction force changing mechanism is able to change a magnitude of the reaction force in advance according to the driver without change in an initial position of the brake pedal; and the reaction force changing mechanism includes:

an elastic member configured to generate a reaction force against a depression force applied to the brake pedal by the driver; and a position changing portion capable of changing a preset position of an end portion of the elastic member opposite to the brake pedal; wherein:

the reaction force generator is a first spring and the elastic member is a second spring;

the brake pedal is configured to rotate about a rotational axis;

each of the first and second springs are connected to the brake pedal; and the second spring is connected to the brake pedal at a position that is closer to the rotational axis than a position at which the first spring is connected to the brake pedal.

3. A brake device for a brake-by-wire system in which a hydraulic pressure generator is driven by an electronic control unit to generate hydraulic pressure in a brake circuit of a vehicle, the brake device comprising:

a housing attached to a body of the vehicle;

a brake pedal rotatably mounted on the housing and not mechanically connected to the hydraulic pressure generator;

a sensor configured to output a signal corresponding to a stroke amount of the brake pedal to the electronic control unit;

a reaction force generator having one end connected to the brake pedal and the other end connected to the housing so as to generate a reaction force against a depression force applied to the brake pedal by a driver; and a reaction force changing mechanism configured to generate a reaction force against a depression force applied to the brake pedal by the driver, wherein the reaction force changing mechanism is able to change a magnitude of the reaction force in advance according to the driver without change in an initial position of the brake pedal; and the reaction force changing mechanism includes:

an elastic member configured to generate a reaction force against a depression force applied to the brake pedal by the driver; and a position changing portion capable of changing a preset position of an end portion of the elastic member opposite to the brake pedal; wherein:

a support plate is fixed to an end of the elastic member;

the support plate is configured to contact a portion of the housing; and the position changing portion is configured to change a position of the support plate so that the support plate is separated from contact with the housing.

* * * * *